United States Patent [19]

Gibler et al.

[11] Patent Number: 5,244,980

[45] Date of Patent: Sep. 14, 1993

[54] SELECTIVE HYDROGENATION OF CONJUGATED DIOLEFIN POLYMERS WITH TEBBE'S REAGENT

[75] Inventors: Carma J. Gibler; Stanley E. Wilson, both of Houston, Tex.

[73] Assignee: Shell Oil Company, Houston, Tex.

[21] Appl. No.: 986,200

[22] Filed: Dec. 7, 1992

[51] Int. Cl.$^5$ ................................................. C08F 8/04
[52] U.S. Cl. ............................... 525/338; 525/332.8; 525/332.9; 525/333.1; 525/333.2; 525/339
[58] Field of Search ................................. 525/338, 339

[56] References Cited

U.S. PATENT DOCUMENTS

| | | |
|---|---|---|
| 4,501,857 | 2/1985 | Kishimoto et al. . |
| 4,673,714 | 6/1987 | Kishimoto et al. . |
| 4,929,699 | 5/1990 | Wilson et al. ........................ 525/338 |
| 4,980,421 | 12/1990 | Teramoto et al. ................... 525/338 |
| 5,039,755 | 8/1991 | Chamberlain et al. . |
| 5,132,372 | 7/1992 | Chamberlain et al. ............. 525/338 |
| 5,141,997 | 8/1992 | Chamberlain et al. ............. 525/330 |
| 5,162,446 | 11/1992 | Gibler et al. ........................ 525/338 |
| 5,169,905 | 12/1992 | Hashiguchi et al. ................ 525/338 |
| 5,173,537 | 12/1992 | Chamberlain et al. ............. 525/338 |
| 5,177,155 | 1/1993 | Chamberlain et al. ............. 525/338 |

FOREIGN PATENT DOCUMENTS

| | | |
|---|---|---|
| 0339986 | 4/1989 | European Pat. Off. . |
| 0434469 | 6/1991 | European Pat. Off. . |
| 61-028507 | 2/1986 | Japan . |
| 62-209102 | 9/1987 | Japan . |
| 62-209103 | 9/1987 | Japan . |
| 2-172537 | 7/1990 | Japan . |

*Primary Examiner*—Bernard Lipman
*Attorney, Agent, or Firm*—Donald F. Haas

[57] ABSTRACT

This is a process for the hydrogenation of conjugated diolefin polymers which comprises polymerizing or copolymerizing at least one conjugated diolefin with an organo alkali metal polymerization initiator in a suitable solvent thereby creating a living polymer, terminating the polymerization by the addition of hydrogen and effecting selective hydrogenation of the unsaturated double bonds in the conjugated diolefin units of the terminated polymer by contacting the polymer with hydrogen in the presence of an organo alkali metal promoter and Tebbe's reagent.

10 Claims, No Drawings

SELECTIVE HYDROGENATION OF CONJUGATED DIOLEFIN POLYMERS WITH TEBBE'S REAGENT

BACKGROUND OF THE INVENTION

The present invention relates to a process for the production of selectively hydrogenated polymers of conjugated dienes and more particularly to such a process utilizing a titanium hydrogenation catalyst.

The hydrogenation or selective hydrogenation of conjugated diene polymers has been accomplished using any of the several hydrogenation processes known in the prior art. For example the hydrogenation has been accomplished using methods such as those taught, for example, in U.S. Pat. Nos. 3,494,942; 3,634,594; 3,670,054; 3,700,633 and Re. 27,145, the disclosure of which patents are incorporated herein by reference. These methods known in the prior art for hydrogenating polymers containing ethylenic unsaturation and for hydrogenating or selectively hydrogenating polymers containing aromatic and ethylenic unsaturation, involve the use of a suitable catalyst, particularly a catalyst or catalyst precursor comprising a Group VIII metal.

In the methods described in the foregoing patents, a catalyst is prepared by combining a Group VIII metal, particularly nickel or cobalt, compound with a suitable reducing agent such as an aluminum alkyl. Also, while aluminum alkyls are the preferred reducing agents, it is known in the prior art that alkyls and hydrides of metals of Groups I-A, II-A and III-B of the Periodic Table of the Elements are effective reducing agents, particularly lithium, magnesium and aluminum. In general, the Group VIII metal compound is combined with Group I-A, II-A or III-B metal alkyl or hydride at a concentration sufficient to provide Group I-A, II-A and/or III-B metal to Group VIII metal ratios within the range from about 0.1:1 to about 20:1, preferably from about 1:1 to about 10:1. As indicated in the foregoing patents, the hydrogenation catalyst is generally prepared by combining the Group VIII metal compound and the reducing agent in a suitable solvent or diluent at a temperature within the range from about 20° C. to about 60° C. before the catalyst is fed to the hydrogenation reactor.

In 1985, Kishimoto et al. disclosed (in U.S. Pat. No. 4,501,857) that selective hydrogenation of the unsaturated double bonds in conjugated diolefin polymers could be achieved by hydrogenating such polymers in the presence of at least one bis(cyclopentadienyl)titanium compound and at least one hydrocarbon lithium compound wherein the hydrocarbon lithium compound can be an added compound or a living polymer having a lithium atom in the polymer chain. European patent application 0,339,986 discloses that similar hydrogenation activity can be accomplished with the same titanium compounds in combination with an alkoxy lithium compound which can either be added directly or as a reaction mixture of an organo lithium compound with an alcoholic or phenolic compound. The use of these catalyst systems was said to be advantageous because the catalysts were said to be highly active so that they were effective even in such a small amount as not to affect adversely the stability of a hydrogenated polymer and require no deashing step. Further, the hydrogenation was said to be able to be carried out under mild conditions.

In U.S. Pat. No. 4,673,714, bis(cyclopentadienyl)titanium compounds were disclosed which preferentially hydrogenate the unsaturated double bonds of conjugated diolefins but do not require the use of an alkyl lithium compound. These titanium compounds were bis(cyclopentadienyl)titanium diaryl compounds. The elimination of the need for the hydrocarbon lithium compound was said to be a significant advantage of the invention disclosed in the '714 patent. U.S. Pat. No. 5,039,755 disclosed another way to use such catalysts without the need for a hydrocarbon lithium compound termination of the polymerization with hydrogen.

SUMMARY OF THE INVENTION

The present invention provides a process for the hydrogenation of conjugated diolefin polymers which first involves the polymerization or copolymerization of such monomers with an organo alkali metal polymerization initiator in a suitable solvent thereby creating a living polymer. The living polymer is terminated, preferably by the addition of hydrogen. Finally, selective hydrogenation of the unsaturated double bonds in the conjugated diolefin units of the terminated polymer is carried out in the presence of an organo alkali metal compound and Tebbe's reagent.

DETAILED DESCRIPTION OF THE INVENTION

As is well known, polymers containing both aromatic and ethylenic unsaturation can be prepared by copolymerizing one or more polyolefins, particularly a diolefin, by themselves or with one or more alkenyl aromatic hydrocarbon monomers. The copolymers may, of course, be random, tapered, block or a combination of these, as well as linear, star or radial.

Polymers containing ethylenic unsaturation or both aromatic and ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as Group IA metals, their alkyls, amides, silanolates, napthalides, biphenyls and anthracenyl derivatives. It is preferred to use an organoalkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:
R is an aliphatic, cycloaliphatic, aromatic or alkyl-substituted aromatic hydrocarbon radical having from 1 to about 20 carbon atoms; and n is an integer of 1 to 4.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like., halogenated hydrocarbons, particularly halogenated aromatic hydrocarbons, such as chlorobenzene, chlorotoluene and the like; linear and cyclic ethers such as methyl ether, methyl ethyl ether, diethyl ether, tetrahydrofuran and the like.

Conjugated diolefin polymers and conjugated diolefin-alkenyl aromatic copolymers which may be used in the present invention include those copolymers described in U.S. Pat. Nos. 3,135,716; 3,150,209; 3,496,154; 3,498,960; 4,45,298 and 4,238,202, the disclosure of which patents are herein incorporated by reference. Conjugated diolefin-alkenyl aromatic hydrocarbon copolymers which may be used in this invention also include block copolymers such as those described in U.S. Pat. Nos. 3,231,635; 3,265,765 and 3,322,856, the disclosure of which patents are also incorporated herein by reference. In general, linear and branched block copolymers which may be used in the present invention include those which may be represented by the general formula:

$$A_z-(B-A)_y-B_x$$

Wherein.
A is a linear or branched polymeric block comprising predominantly monoalkenyl aromatic hydrocarbon monomer units;
B is a linear or branched polymeric block containing predominantly conjugated diolefin monomer units;
x and z are, independently, a number equal to 0 or 1;
y is a whole number ranging from 0 to about 15, and the sum of $x+z+y \leq 2$.

Polymers which may be treated in accordance with this invention also include coupled and radial block copolymers such as those described in U.S. Pat. Nos. 4,033,888; 4,077,893; 4,141,847; 4,391,949 and 4,444,953, the disclosure of which patents are also incorporated herein by reference. Coupled and radial block copolymers which may be treated in accordance with the present invention include those which may be represented by the general formula:

$$[B_x-(A-B)_y-A_z]_n-C-P_n$$

Wherein:
A, B, x, y and z are as previously defined; n and n' are, independently, numbers from 1 to about 100 such that $n+n' \geq 3$;
C is the core of the coupled or radial polymer formed with a polyfunctional coupling agent; and
Each P is the same or a different polymer block or polymer segment having the general formula:

$$B'_{x'}-(A'-B'')_{y'}-A''_{z'}$$

Wherein:
A" is a polymer block containing predominantly monoalkenyl aromatic hydrocarbon monomer units;
B' is a polymer block containing predominantly conjugated diolefin monomer units;
A'-B" is a polymer block containing monoalkenyl aromatic hydrocarbon monomer units (A') and conjugated diolefin monomer units (B"), the A'-B" monomer units may be random, tapered or block and when A'-B" is block, the A' block may be the same or different from A" and B" may be the same or different from B';
x' and z' are, independently, numbers equal to 0 or 1; and
y' is a number from 0 to about 15, with the proviso that the sum of $x'+y'+z \geq 1$.

The radial polymers may, then, be symmetric or asymmetric.

In the production of all of the polymers described above, it is necessary that the polymerization be terminated before hydrogenation. Such termination is commonly carried out by addition of an alcohol, such as methanol. The alcohol removes the Li atom from the living polymer, thereby terminating the polymerization and creating, for example, lithium methoxide. Preferably, the polymer is terminated by utilizing hydrogen gas in place of the conventionally used alcohol terminating agent. The living polymer, or more accurately, the living end of the polymer chain, is terminated by the addition of hydrogen thereto. The theoretical termination reaction is shown using an S-B-S block copolymer for exemplary purposes:

$$S-B-S^-Li^+ + H_2 \rightarrow S-B-SH + LiH$$

As shown above, it is theorized that lithium hydride is formed during the termination process. Formed in this manner, it is not a reactive polymerization initiator. It is inert to polymerization and does not interfere with the molecular weight control of the next polymerization batch as alcohol can.

It is usually advisable to contact and vigorously mix the gas with the polymerization solution at the end of the polymerization reaction. This contact and vigorous mixing can be effected by adding the hydrogen gas through spargers in a mixing vessel containing polymer solution. The time of contact should be at least about ten seconds and preferably about twenty minutes to allow sufficient contact time for the reaction to occur. This is dependent upon the efficiency of the gas contacting equipment, gas solubility, solution viscosity and temperature. Alternatively, a continuous system could be employed whereby hydrogen is pumped into a solution prior to going to a statically mixed plug flow reactor. Hydrogen could also be dissolved in an appropriate solution and added to the polymer solution to be terminated. Another method would be to cause the hydrogen to be absorbed into an absorption bed and then cause the polymer solution to flow through the absorption bed. The hydrogen contact could also be carried out by adding a material which gives off hydrogen upon decomposition, i.e. diimide.

When this improvement is used, the problems of using alcohol, i.e. the formation of lithium alkoxides and excess alcohol impurities, are avoided. Furthermore, this process has been found to have significant advantage if the polymer made is to be hydrogenated. It has been found that if the present method is used, a bis(cyclopentadienyl)titanium hydrogenation catalyst may be used without the necessity of a hydrocarbon lithium or alkoxy lithium promoter, whether added with the catalyst or present in the living polymer.

As stated above, the hydrogenation step of the present process is carried out in the presence of an organo alkali metal compound and Tebbe's reagent. Tebbe's reagent is $\mu$-chloro-$\mu$-methylene-bis(cyclopentadienyl) titaniumdimethylaluminum. The structure is:

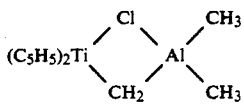

An organo alkali metal compound is necessary to act as a promoter for the hydrogenation catalyst. These organo alkali metal compounds are preferably hydrocarbon lithium compounds, including ethyllithium, methyllithium, n-propyllithium, n-butyllithium, sec-butyllithium, isobutyllithium, t-butyllithium, n-hexyllithium, phenyllithium and many others well known in the art. The preferred promoters are n-butyllithium and sec-butyllithium because of the availability, cost and relative ease in handling.

This process will selectively hydrogenate conjugated diolefins without hydrogenating alkenyl aromatic hydrocarbons to any degree. Hydrogenation percentages of greater than 50% are easily obtained but it has been found that in order to achieve hydrogenation percentages of greater than 95% as is often desired, the alkali metal (for example, lithium) to titanium ratio must be at least 2 and preferably is from 5 to 15. There has to be sufficient alkali metal to ensure quick and sufficient interaction between the two metals. A high viscosity (high molecular weight) polymer may require a higher ratio because of the lesser mobility of the metals in the polymer cement. If alkali metal hydride must be added to increase the ratio, it can be made in situ by adding an organo alkali metal compound and hydrogen to the polymer (i.e., sparge), either before or after termination of the polymerization.

In general, the hydrogenation is carried out in a suitable solvent at a temperature within the range of from 0° to 120° C., preferably 60° to 90° C., and at a hydrogen partial pressure within the range from 1 psig to 1200 psig, preferably about 750 psig. Catalyst concentrations within the range from 0.01 mM(millimoles) per 100 grams of polymer to 20 mM per 100 grams of polymer, preferably 0.04 to 2 mM catalyst per 100 grams of polymer, are generally used and contacting at hydrogenation conditions is generally continued for a period of time within the range from 30 to 360 minutes. Suitable solvents for hydrogenation include, among others, n-heptane, n-pentane, tetrahydrofuran, cyclohexane, toluene, hexane and benzene. Because of the small amount of catalyst present in the polymer after hydrogenation, it is not necessary to separate the hydrogenation catalyst and catalyst residue from the polymer. However, if separation is desired, it may be carried out using methods well known in the prior art. Hydrogenation may be carried out in other manners such as batch processes, continuous processes and semi-continuous processes.

EXAMPLES

Block copolymers of styrene and butadiene were polymerized. The polymerizations were terminated using methanol. Styryllithium living ends have an absorption maximum at 328 m$\mu$ and thus have a distinct orange color which turn colorless when the living ends are terminated. This was observed as samples were pulled from the reactor and visually, as well as colorimetrically, examined for color change.

EXAMPLE 1

A 600 lb. batch of polystyrene-polybutadiene-polystyrene (S-B-SL$^-$Li$^+$) block copolymer 50,000 molecular weight was made by anionic polymerization using sec-butyllithium as the initiator in a stirred, pressurized reactor. The polymerization took place in a mixture of cyclohexane and diethyl ether. It was terminated by addition of methanol. The resulting polymer solution contained 20% polymer by weight.

EXAMPLE 2

A 600 lb. batch of polyisoprene-polystyrene (I-S$^-$Li$^+$) block copolymer 97,000 molecular weight was made by anionic polymerization using sec-butyllithium as the initiator in a stirred, pressurized reactor. The polymerization took place in cyclohexane. It was terminated by addition of methanol. The resulting polymer solution contained 15% polymer by weight.

EXAMPLES 3-5

All hydrogenation runs were carried out under similar conditions unless otherwise noted. A typical experimental hydrogenation run consisted of pressure transferring to a 4 liter reactor a 20% by weight solution of polymer. This was then diluted with cyclohexane so that the reactor contained 1560 g of a 5% polymer solution. The temperature of the reactor was 90° C. and it was purged with hydrogen. The sec-butyllithium cocatalyst was then added. At this point, Tebbe's reagent was added to the reactor as a diethyl ether slurry. After addition of the catalyst, the reactor was pressurized to 750 psig with hydrogen gas. The reaction was allowed to run for 2-3 hours, during which time samples were drawn from the reactor and analyzed by ozone titration of the residual olefin unsaturation to determine final percent conversion of olefin. Gel Permeation Chromatography (GPC) was done on final samples to determine if there had been any changes in molecular architecture.

EXAMPLE 3

The polymer of Example 1 was hydrogenated with 1.1 mM of catalyst or 1.4 mM catalyst per 100 grams of polymer and sec-butyllithium (10:1 Li:Ti ratio) as the cocatalyst. The hydrogenation was carried out for 180 minutes and the final conversion was 96.8%.

EXAMPLE 4

The polymer of Example 1 was hydrogenated with 1.1 mM of catalyst or 1.4 mM catalyst per 100 grams of polymer except that sec-butyllithium was not used. The hydrogenation was carried out for 180 minutes and the final conversion was 16.3%. This example shows the need for the sec-butyllithium cocatalyst.

EXAMPLE 5

The polymer of Example 2 was hydrogenated with 1.1 mM of catalyst or 1.4 mM per 100 grams of polymer and sec-butyllithium (20:1 Li:Ti ratio). The hydrogenation was carried out for 120 minutes and the final conversion was 33.8%. This example shows that polyisoprene is more difficult to hydrogenate than polybutadiene. More catalyst will be needed to fully hydrogenate the polyisoprene.

We claim:

1. A process for the hydrogenation of conjugated diolefin polymers which comprises:
   (a) polymerizing or copolymerizing at least one conjugated diolefin with an organo-alkali metal polymerization initiator in a suitable solvent, and
   (b) selectively hydrogenating the unsaturated double bonds in the conjugated diolefin units of said terminated polymer by contacting the polymer with hydrogen in the presence of an organo alkali metal promoter and Tebbe's reagent.

2. The process of claim 1 wherein the hydrogenation is carried out at a temperature from 0° C. to 120° C. and a pressure of from 1 psig to 1200 psig and the catalyst concentration is from 0.01 mM to 20 mM of titanium per 100 g of polymer and the contacting takes place for a period of time within the range from 15 to 1440 minutes.

3. The process of claim 2 wherein the catalyst concentration is from 0.04 to 2 mM titanium per 100 g of polymer.

4. The process of claim 1 wherein the alkali metal to titanium ratio is at least 2.

5. The process of claim 4 wherein said ratio is from 5 to 15.

6. The process of claim 1 wherein the organo alkali metal compound is a hydrocarbon lithium compound.

7. The process of claim 6 wherein the hydrocarbon lithium compound is sec-butyllithium.

8. The process of claim 1 wherein the conjugated diolefin is selected from the group consisting of butadiene and isoprene.

9. The process of claim 1 wherein the diolefin is copolymerized with a vinyl aromatic hydrocarbon.

10. The process of claim 9 wherein the copolymer is a block copolymer having at least one conjugated diene polymer block and at least one styrene block.

* * * * *